(12) United States Patent
Blanchard

(10) Patent No.: US 6,475,109 B2
(45) Date of Patent: Nov. 5, 2002

(54) TRANSMISSION FOR A SELF-PROPELLED MACHINE AND WHEELED SELF-PROPELLED MACHINE, IN PARTICULAR A LAWN MOWER

(75) Inventor: Robert Blanchard, Le Boupere (FR)

(73) Assignee: France Reducteurs S.A., Les Herbiers (FR)

( * ) Notice: Subject to any disclaimer, the term of this patent is extended or adjusted under 35 U.S.C. 154(b) by 0 days.

(21) Appl. No.: 09/730,862

(22) Filed: Dec. 7, 2000

(65) Prior Publication Data

US 2001/0020565 A1 Sep. 13, 2001

(30) Foreign Application Priority Data

Dec. 7, 1999 (FR) .............................. 99 15396

(51) Int. Cl.⁷ .............................. F16H 7/08; A01D 69/08
(52) U.S. Cl. ........................ 474/101; 474/115; 56/11.7; 56/11.8
(58) Field of Search ................ 56/11.3, 11.6, 56/11.7, 11.8; 476/26, 79, 114, 115, 116, 117, 101

(56) References Cited

U.S. PATENT DOCUMENTS

| | | |
|---|---|---|
| 4,117,652 A | 10/1978 | Jones et al. |
| 4,835,949 A | 6/1989 | Seyerle |
| 4,896,487 A | 1/1990 | Hikishima et al. |
| 4,907,401 A | 3/1990 | Nemoto et al. |
| 5,718,105 A * | 2/1998 | Irikura et al. ............... 56/11.4 |
| 5,778,645 A * | 7/1998 | Irikura et al. ............... 56/11.8 |
| 5,887,484 A | 3/1999 | Abend et al. |

* cited by examiner

Primary Examiner—David A. Bucci
Assistant Examiner—Timothy McAnulty
(74) Attorney, Agent, or Firm—Young & Thompson

(57) ABSTRACT

A transmission for a self-propelled engine includes an endless transmission (1) with a belt (2) between a driving pulley (3) and a driven pulley (4) carried by the input shaft (5) of a clutch engaging mechanism (7) whose output shaft (6) is coupled to the wheels (20) of the machine. The clutch engaging mechanism (7) is a toothed clutch engagement disposed within a housing (19) mounted oscillably about the output shaft (6) of the clutch engaging mechanism (7) in the direction of tensioning or respectively relaxing the belt (2) of the endless transmission, at least under the action of a control mechanism (13), whose operation is subject to the control member (10) of the clutch engaging mechanism so as to give rise to the passage to the clutch engaged condition of the clutch engaging mechanism (7) and then the tensioning of the belt (2).

6 Claims, 4 Drawing Sheets

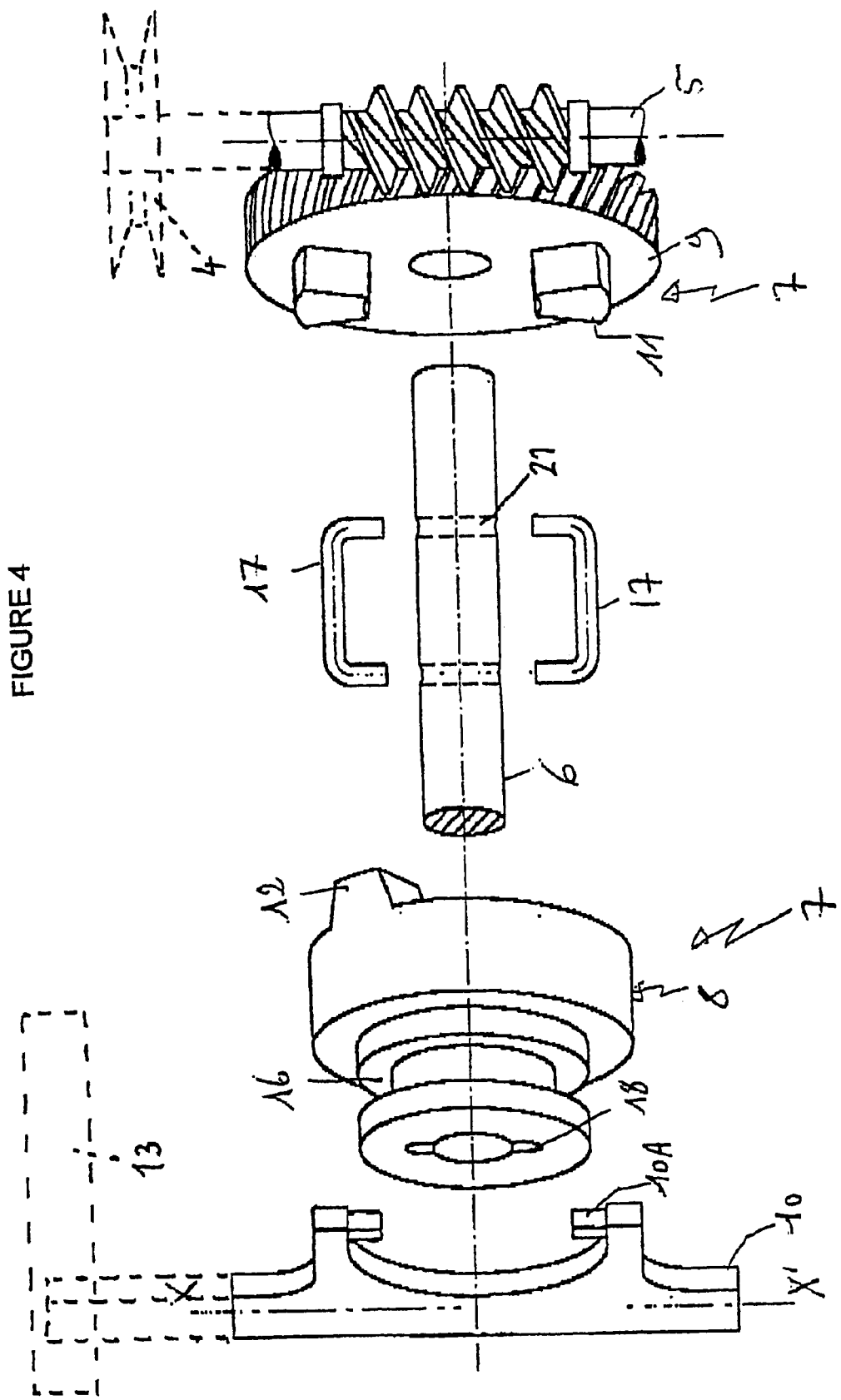

TRANSMISSION FOR A SELF-PROPELLED MACHINE AND WHEELED SELF-PROPELLED MACHINE, IN PARTICULAR A LAWN MOWER

BACKGROUND OF THE INVENTION

The present invention relates to a transmission for a self-propelled machine, such as a self-propelled lawn mower, as well as a self-propelled machine provided with such a transmission.

The present invention relates more particularly to a transmission of the type comprising an endless belt transmission between a drive pulley mounted on a primary motor shaft constituting, in the case of a lawn mower, the driven shaft that carries the mowing blade of said mower and driven pulley carried by the input shaft of a clutch engaging mechanism whose output shaft is coupled to the wheels of the machine.

A transmission of this type is particularly provided in the European patent application EP 0 717 920. Such a transmission operates perfectly when clutch engagement is of the progressive type. In the contrary case, there is experienced a certain number of jolts with each clutch engagement, jolts which are disagreeable for the driver and which are adapted to lead to accidents. However, such progressive clutch engaging mechanisms are generally complicated and cumbersome.

Another category of transmission is constituted by transmissions incorporating only transmissions without an endless belt. Unclutching such a transmission without a belt is generally carried out by relaxing the belt. However, during use, it happens that the belt in the relaxed condition is maintained continuously in frictional engagement in the throat of the pulley. This friction gives rise on the one hand to premature wear of the belt, and on the other hand to a resistant couple, in particular when the self-propelled machine is driven in reverse. A second drawback of these endless belt transmissions resides in the difficulty of guiding the belt to bring it to the slack condition and then to return it to the stretched position.

Finally, there is known from U.S. Pat. No. 4,907,401 a transmission for a self-propelled machine of the type comprising an endless belt transmission between a driving pulley mounted on a primary motor shaft and a driven pulley carried by the input shaft of a mechanism, generally a speed reducer, with clutch engagement whose output shaft is coupled to the wheels of the machine, the clutch engaging mechanism being a non-progressive clutch engagement with a toothed clutch disposed within a housing, this housing being mounted oscillably about the output shaft of the clutch engaging mechanism in the direction of tension or respectively of relaxation of the endless transmission belt, at least under the action of a control mechanism constituted by a pivoting lever which at least partially projects from the housing, the operation of this lever being subject to a control member of the clutch engaging mechanism so as to give rise, in the first instance, to the passage from the clutch engaged position of the mechanism with clutch engagement and then, in the second instance, the tensioning of the belt to obtain movement of the machine. Such a transmission requires, to obtain a variation of the speed of advance of the machine, the incorporation in the clutch engaging housing of a speed change box. This speed box is controlled by a lever by the operator. The operator must thus act on the one hand on the speed change lever, and on the other hand on the clutch engagement mechanism to obtain advance of the machine with variable speed. Such an embodiment is complex and cumbersome and complicated to use.

SUMMARY OF THE INVENTION

An object of the present invention is to provide a transmission for a self-propelled machine whose design permits being perfectly unclutchable in a way so as not to prevent, in the unclutched position, the forward or rearward movement of said machine, this transmission moreover permitting forward movement at variable speed of the machine without having recourse to a speed change box.

Another object of the present invention is to provide a transmission for a self-propelled machine whose design permits a passage to the clutch engaged position which takes place in a progressive manner without jolts, despite the presence of a non-progressive type of clutch engagement.

To this end, the invention has for its object a transmission for a self-propelled machine of the type comprising an endless belt transmission between a driving pulley mounted on a primary motor shaft and a driven pulley carried by the input shaft of a mechanism, generally a speed reducer, with clutch engagement whose output shaft is coupled to the wheels of the machine, the clutch engaging mechanism being a non-progressive toothed clutch engagement disposed within a housing, this housing being mounted swingably about the output shaft of the clutch engaging mechanism in the direction of tension or respectively of relaxation of the belt of the endless transmission, at least under the action of a control mechanism constituted by a pivotal lever which projects at least partially from the housing, the function of this lever being subject to the control member of the clutch engaging mechanism so as to cause, in a first instance, the passage from the clutch engaged position of the clutch engaging mechanism, then, in a second instance, the tensioning of the belt to obtain movement of the machine, characterized in that the movement of the machine is of the variable speed type, the variation of speed being obtained by variation of the tension applied to the belt with the aid of the pivoting lever disposed outside the clutch engaging housing, so as to eliminate any speed change box with multiple ratios, within said housing.

Thanks to this swinging movement of the housing of the clutch engaging mechanism on the output shaft of the clutch engaging mechanism, it is possible to obtain, in a first instance, the passage to the clutch engaged position of the clutch engaging mechanism and then, in a second instance, the tensioning of the endless transmission belt such that the clutch engagement takes place in a progressive manner, the passage to the unclutched position taking place generally in the reverse manner, namely, by oscillation of the housing in a reverse direction to ensure relaxation of the tension, then passage to the unclutched position of the clutch engaging mechanism. The endless transmission is thus used as a second clutching mechanism which renders the first clutching mechanism progressive. This endless transmission is moreover used as a speed change device by simple variation of the tension of the belt controlled by means of the same control mechanism as that controlling clutch engagement. As a result, there is an extreme simplification of the transmission of the machine.

The invention also relates to a self-propelled wheeled machine, particularly a lawn mower, characterized in that it is provided with a transmission of the above type.

BRIEF DESCRIPTION OF THE DRAWINGS

The invention will be understood from a reading of the following description of embodiments, with reference to the accompanying drawings, in which:

FIG. 4 is a fragmentary perspective view of the clutch engaging mechanism disposed within the housing in an exploded position of its constituent elements.

DESCRIPTION OF THE PREFERRED EMBODIMENTS

Figure 1:
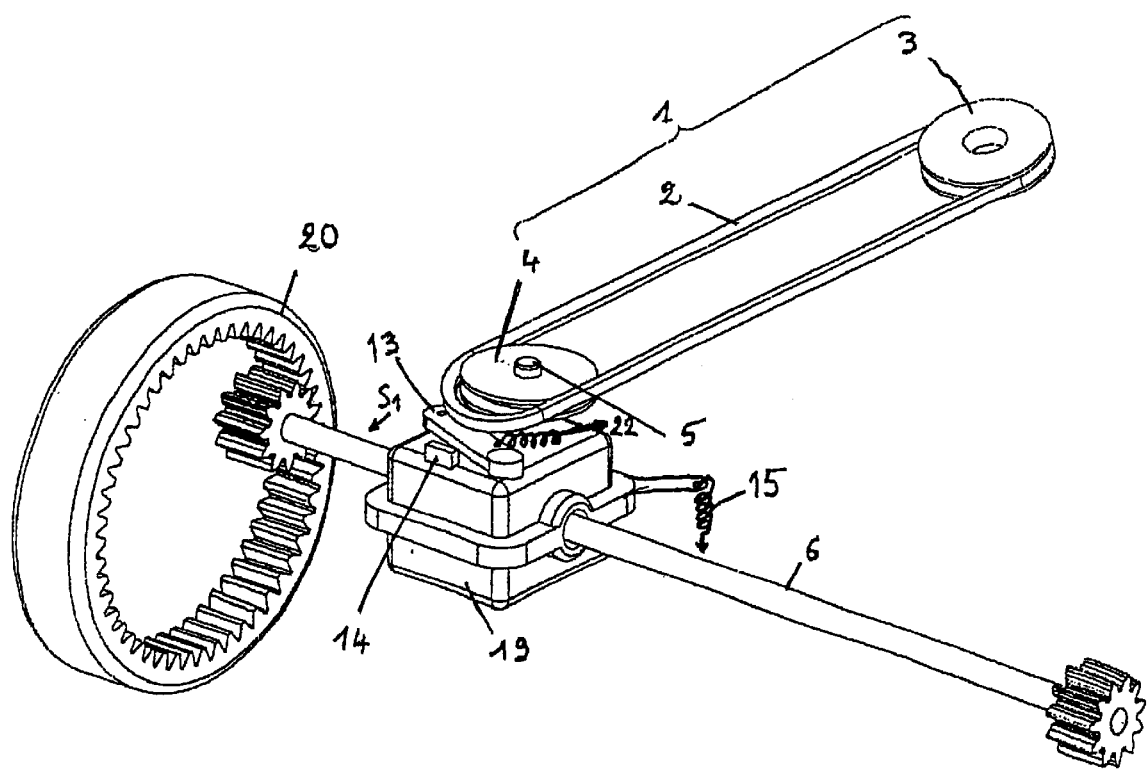
FIGS. 1 to 3 are fragmentary perspective views of a transmission according to the invention in various positions of the housing.
Figure 2:
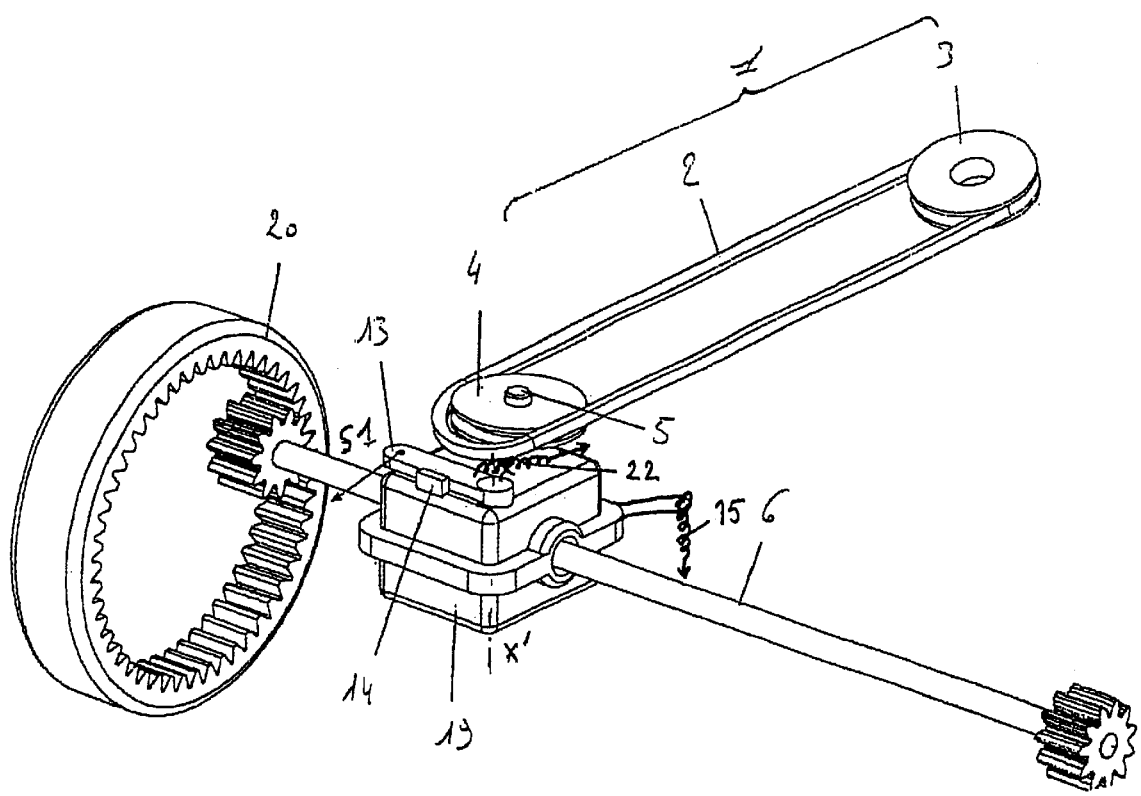
Figure 3:
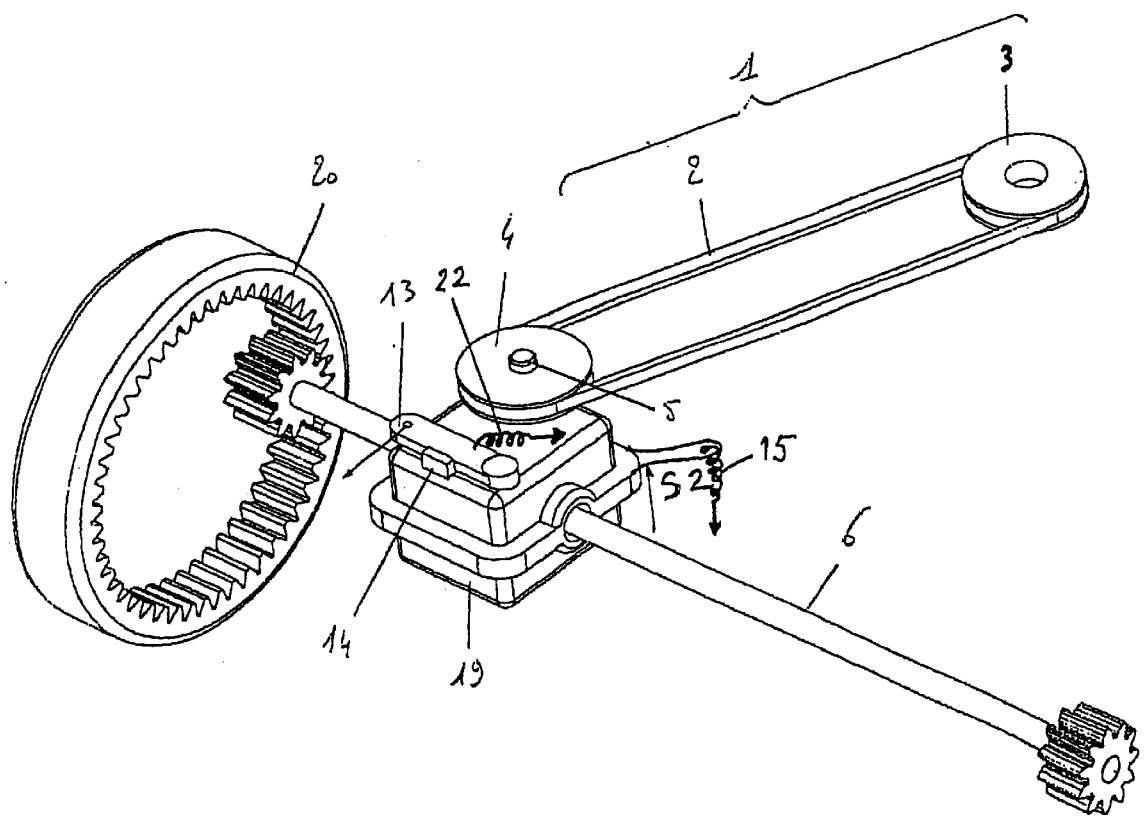

The transmission according to the invention is more particularly adapted to self-propelled machines, in particular self-propelled lawn mowers. This transmission ensures for example a transition between the primary motor shaft of the lawn mower which carries the mowing blade and the output shaft 6 of a clutch engaging mechanism 7. This output shaft 6 of the clutch engaging mechanism is coupled to the wheels 20 of the lawn mower as shown in FIGS. 1 to 3. It is to be noted that this connection between the output shaft 6 of the clutch engaging mechanism 7 and the wheels 20 of the self-propelled machine, can be of any type whatsoever, this connection being adapted particularly to include a speed reduction mechanism.

The transmission according to the invention comprises, generally speaking, an endless transmission 1 with a belt 2. This transmission 1 is constituted by a driving pulley 3 mounted generally on the primary motor shaft that carries the blade of said machine, and a driven pulley 4 carried by the input shaft 5 of a clutch engaging mechanism 7. A belt 2 ensures speed transmission between driving pulley 3 and driven pulley 4.

The input shaft 5 of the clutch engaging mechanism 7 is partially disposed in a housing 19 containing the clutch engaging mechanism 7. The output shaft 6 of the clutch engaging mechanism is itself coupled to the wheels 20 of the machine. It will be noted that, in the illustrated examples, the input shaft 5 of the clutch engaging mechanism 7 and the output shaft 6 of the clutch engaging mechanism are disposed substantially orthogonally to each other. The output shaft 6 of the clutch engaging mechanism 7 passes through the housing 19 which receives said mechanism, from side to side.

This clutch engaging mechanism 7, carried by the output shaft 6 of said mechanism, is a non-progressive clutch engagement of the toothed clutch engaging type. In the illustrated examples, this clutch engaging mechanism 7 is constituted by a sleeve 8 (FIG. 4) movable axially under the action of a clutch engaging control member 10, such as a fork, and secured in rotation to the output shaft 6 of the clutch engaging mechanism. This sleeve 8 is adapted to coact by toothed engagement with a driven member, such as a toothed wheel 9, mounted freely in rotation on the output shaft 6 of the mechanism. This toothed wheel 9 comes into engagement with an endless screw constituting the input shaft 5 of the clutch engaging mechanism 7. In this case, the clutch engaging mechanism 7 is a clutch engaging speed reducing mechanism because of the presence of the toothed wheel 9 and the endless screw. However, this speed reduction device could be omitted without departing from the scope of the invention.

The toothed engagement between sleeve 8 and toothed wheel 9 is obtained by means of teeth 11, 12 disposed respectively on the facing surfaces of the toothed wheel 9 and the sleeve 8. During axial movement of the sleeve 8 in the direction toward the toothed wheel 9, the teeth 12 of the sleeve 8 enter between the teeth 11 of the toothed wheel 9 so as to ensure, under the influence of the rotational drive of the toothed wheel 9, a rotational drive of the sleeve 8, and, consequently, a rotational drive of the output shaft 6 of the clutch engaging mechanism.

To permit free axial movement and securement in rotation of the sleeve 8 on the output shaft 6 of the clutch engaging mechanism 7, the sleeve 8 of the clutch engaging mechanism 7 comprises, for example about the internal periphery of its hole serving for the reception of the shaft 6, at least two axial grooves 18 arranged to coact slidably with at least two staples 17 secured to the output shaft 6 of the clutch engaging mechanism 7. To permit this securement of the stapes 17 to the output shaft 6 of the clutch engaging mechanism 7, the shaft 6 is provided with radial through holes 21 serving for the reception of the parallel legs of each staple 17. It is to be noted that other rotationally securing means such as channels provided respectively on the shaft 6 and the internal periphery of the sleeve 8, the use of a polygonal shaft 6 or other means could be envisaged to obtain mounting freely in axial movement but secured in rotation, the sleeve 8 on the shaft 6.

As mentioned above, the axial movement of the sleeve 8 is obtained by means of a control member 10. In the illustrated examples, this control member 10 for the clutch engaging mechanism 7 is constituted by a fork with two legs, each leg of the fork being provided with a radial internal tooth 10A so as to ensure a clipping of the fork within an annular external throat 16 of the sleeve 8. This clipping permits rotational driving of the fork 10 about the sleeve 8. The interest of this possibility of moving rotationally the fork 10 about the sleeve 8 will be described hereafter.

The assembly of the elements of the clutch engaging mechanism 7 described above is disposed within the housing 19. This housing 19 is floatingly mounted relative to the rest of the chassis of the machine to be able, under the influence of a control mechanism 13, to oscillate about the output shaft 6 of the clutch engaging mechanism 7, in particular in the direction of a variable and adjustable tension of the belt 2 of the endless transmission when the clutch engaging mechanism 7 is in the engaged condition.

Because of this possibility of swinging or oscillation of the housing 19 about the output axle 6 of the clutch engaging mechanism 7, the housing 19 of the clutch engaging mechanism is returned resiliently or by means of a counter-weight, to the position corresponding to the relaxed or slack condition of the belt 2 of the endless transmission. This condition is more particularly shown in FIGS. 1 and 2, in which it can be seen that the belt 2 has left the throat of the driven pulley 4.

To bring the oscillating housing 19 into a position in which the belt 2 of the endless transmission is tensioned, a control mechanism for the movement of the housing 19 is necessary. In the illustrated examples, this control mechanism for the movement of the oscillating housing 19 is constituted by a lever 13 pivotally mounted on the housing 19 of the clutch engagement mechanism 7. This lever 13, pivoting about an axis XX', at least partially projects from the housing 19. This lever 13 is mechanically coupled to the control member 10 of the clutch engaging mechanism 7 so as to bring about, during a pivoting drive of the lever 13, particularly under the action of a control cable (not shown) acting on said lever 13, the passage to the clutch engaged position of the clutch engaging mechanism 7 and then, in a second instance, by co-action of the lever 13 with an abutment 14 provided on the housing 19, the oscillation of the housing 19 in the direction to tension the belt 2 of the endless transmission, the path of the lever 13 bearing against the abutment 14 being selected as a function of the speed of advance to be achieved. The tension in the belt 2 of the transmission is variable as a function of the path of the lever 13. An increase of the tension in the belt 2 brought about by a long path of the lever 13 to within a predetermined movement range, generates an increase of the speed of advance of the machine. Conversely, the choice by the operator to drive in displacement the lever 13 over a path shorter than the long path, generates a lesser lifting of the oscillating housing 19 and accordingly less tension in the belt, such that the speed of advance of the machine is less than that obtained with the long path of the lever 13. As a result, the speed of advance of the machine is a function of the path of the pivoting lever 13 and accordingly of the angular position of the pivoting housing 19, the variation of this position of the housing 19 giving rise to a variation of the tension of the belt 2. This pivoting lever 13 of the control mechanism for movement of the oscillating housing 19 is resiliently returned to the unclutched position of the mechanism 7, the resilient return member 22 of the pivoting clutch engaging lever 13 having a resistance to traction less than that of the resilient return member 15 of the housing 19 in the slack position of the belt 2 of the endless transmission.

FIGS. 1 to 3 show different movements. In FIG. 1, the oscillating housing 19 is in an inactive position corresponding to a relaxed condition of the belt 2 of the endless transmission 1, and the clutch engaging mechanism 7 is in the unclutched condition. In FIG. 2, the control lever 13 for movement of the oscillating housing 19 has been driven pivotally in the direction of the arrow Sl under the action of a control cable connected to the lever 13 and controlled by traction. This pivoting movement gives rise simultaneously to bring into the clutch engaged position the clutch engaging mechanism, because of the mechanical coupling between the lever 13 and the fork 10 of the control of the clutch engaging mechanism 7. To facilitate comprehension of the assembly, the axes of rotation of the fork 10 and of the lever 13, which are identical, have been represented by the axis XX'.

Continuing to drive pivotally the lever 13, brought into abutment against the abutment 14, drives swingably the housing 19 about the output shaft 6 of the clutch engaging mechanism in the direction of the arrow S2, as shown in FIG. 3. This swinging of variable amplitude as a function of the path of pivoting lever 13, gives rise to a variable tension of the belt 2 of the transmission 1 such that the rotational movement of the drive pulley 3 can be transmitted to the driven pulley 4 which itself transmits this movement by means of the clutch engaging mechanism 7 to the output shaft 6 of the clutch engaging mechanism 7, thereby causing driving in rotation of the wheels 20 of the machine at a variable speed.

The control member 10 of the clutch engaging mechanism 7 or the fork 10 of the clutch engaging mechanism 7 is also resiliently returned to the unclutched position of the mechanism 7 by a spring (not shown) and in this way in a known manner. This resilient return member of the clutch engaging mechanism 7 has a resistance to traction less than that of the resilient return member 15 of the housing 19 in the relaxed position of the belt 2 of the endless transmission.

Thanks to the return members 15 and 22, it is possible to act, by means of the control cable, on a single control member to give rise successively to the passage to the clutch engaged position of the clutch engaging mechanism 7, and the tension of the belt 2 to a value that is variable as a function of the desired speed of advance of the machine.

What is claimed is:

1. A transmission for a self-propelled machine comprising:

an endless transmission (1) with a belt (2) between a drive pulley (3) mounted on a primary motor shaft and a driven pulley (4) carried by an input shaft (5) of a clutch engaging mechanism (7) having an output shaft (6) coupled to wheels (20) of the machine, the clutch engaging mechanism (7) being disposed within a housing (19) mounted oscillably about the output shaft (6) of the clutch engaging mechanism (7) in the direction of tension or relaxation of the belt (2) of the endless transmission under the action of a pivoting lever (13) that projects from the housing (19), the lever (13) being subject to a control member (10) of the clutch engaging mechanism so as to give rise, in a first instance, to a clutch engaged condition of the clutch engaging mechanism (7), then, in a second instance, to tensioning of the belt (2) to obtain movement of the machine, wherein a variation of a speed of the machine is obtained by variation of the tension applied to the belt (2) with the help of the pivoting lever (13) disposed outside the clutch engaging housing (19), so as to avoid any speed change box with multiple ratios within said housing (19), and wherein the clutch engaging mechanism (7) comprises a sleeve (8) movable axially under the influence of the control member (10) for clutch engagement and secured in rotation to the output shaft (6) of the clutch engaging mechanism, said sleeve (8) being arranged and adapted to coact by toothed engagement with a driven member that is mounted freely in rotation on said output shaft (6), said toothed wheel (9) coming into engagement with an endless screw constituting the input shaft (5) of the clutch engaging mechanism (7).

2. The transmission according to claim 1, wherein the pivoting lever (13) is mechanically coupled to the control member (10) of the clutch engaging mechanism (7) so as to cause, during pivotal driving of the lever (13), passage to the clutch engaged position of the clutch engaging mechanism (7), then, in the second instance, by coaction of the lever (13) with an abutment (14) provided on the housing (19), oscillation of the housing (19) in a direction to place under variable tension the belt (2) of the endless transmission, travel of the lever (13) bearing against the abutment (14) being selected as a function of the speed to be achieved (13).

3. The transmission according to claim 2, wherein the pivoting lever (13) is resiliently returned to the unclutched position of the clutch engaging mechanism (7) by a resilient return member (22) having a resistance to traction less than that of a resilient return member (15) of the housing (19) in the relaxed position of the belt (2).

4. The transmission according to claim 1, wherein the sleeve (8) of the clutch engaging mechanism (7) comprises on its internal periphery at least two grooves (18) axially arranged to coact by sliding with at least two staples (17) secured to the output shaft (6) of the clutch engaging mechanism (7).

5. The transmission according to claim 1, wherein the control member (10) of the clutch engaging mechanism (7) comprises a fork with two legs, each leg of the fork being provided with a radial internal tooth (10A) so as to ensure clipping in of the fork within an annular external throat (16) of the sleeve (8), this clipping permitting driving in rotation of the fork (10) about said sleeve (8).

6. A wheeled self-propelled machine comprising a transmission according to claim 1.

* * * * *